(12) United States Patent
Leaver et al.

(10) Patent No.: US 6,589,296 B1
(45) Date of Patent: Jul. 8, 2003

(54) DISPERSE DYE MIXTURES

(75) Inventors: Alan Thomas Leaver, Eccles (GB); David Brierley, Royton (GB)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/701,375

(22) PCT Filed: Dec. 2, 1999

(86) PCT No.: PCT/GB99/04026

§ 371 (c)(1), (2), (4) Date: Nov. 30, 2000

(87) PCT Pub. No.: WO00/32697

PCT Pub. Date: Jun. 8, 2000

(30) Foreign Application Priority Data

Dec. 3, 1998 (GB) ................................ 9826659

(51) Int. Cl.[7] .............. D06P 3/54; D06P 3/87; C09B 67/38

(52) U.S. Cl. ............ 8/532; 8/533; 8/638; 8/639; 8/922

(58) Field of Search .............. 8/638, 639, 922, 8/529, 532, 533

(56) References Cited

U.S. PATENT DOCUMENTS

| | | | |
|---|---|---|---|
| 4,985,044 A | * | 1/1991 | Hahnke et al. |
| 5,160,348 A | * | 11/1992 | Hoppe et al. |
| 5,660,598 A | * | 8/1997 | Cavanaugh et al. |
| 6,022,957 A | * | 2/2000 | Leaver |

FOREIGN PATENT DOCUMENTS

| | | |
|---|---|---|
| EP | 0 346 715 | 12/1989 |
| EP | 0 347 685 | 12/1989 |
| EP | 0 675 174 | 10/1995 |
| JP | 63-29927 | * 11/1994 |
| WO | WO 94/10248 | 5/1994 |
| WO | WO 97/04030 | 2/1997 |

* cited by examiner

Primary Examiner—Margaret Einsmann
(74) Attorney, Agent, or Firm—Oblon, Spivak, McClelland, Maier & Neustadt, P.C.

(57) ABSTRACT

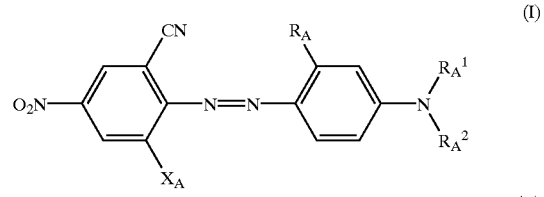

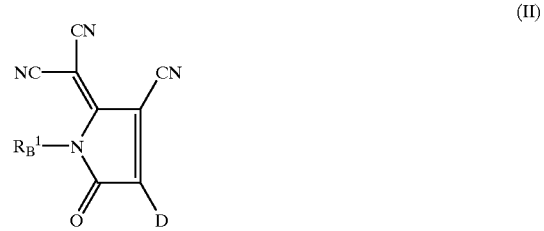

A dye mixture comprises (A) at least one monoazo dye of formula (I) wherein $X_A$ is Cl, Br, I, CN or $NO_2$; $R_A$ is $C_{1-4}$alkyl or NHCOQ, where Q is $C_{1-4}$alkyl; and each of $R_A^1$ and $R_A^2$, independently, is $C_{1-4}$alkyl, $C_{2-4}$akenyl, $C_{1-4}$alkoxy-$C_{1-4}$alkyl, aryl-$C_{1-4}$ alkyl or aryloxy-$C_{1-4}$alkyl; and (B) at least one pyrroline type dye of formula (II) wherein $R_B^1$ is H, $C_{1-20}$alkyl or $C_{2-20}$alkenyl; and D is aryl.

22 Claims, No Drawings

DISPERSE DYE MIXTURES

This invention relates to mixtures of disperse dyes, compositions comprising dispersions of such mixtures and processes for the colouration of synthetic materials with such mixtures. More particularly, the invention relates to mixtures of reddish blue monoazo dyes with those of the so called pyrroline type, which tend to be greenish blue.

Monoazo dyes of the above type are disclosed in EP-A-0300626 and EP-A-0347685.

As a component of a mixture of dyes, EP-A-0300626 discloses a dye of the formula

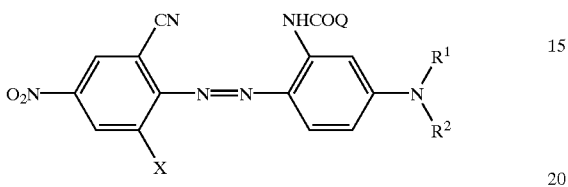

where X is Br, Cl or I; Q is $C_{1-4}$alkyl; and each of $R^1$ and $R^2$ independently is $C_{1-4}$alkyl or $C_{2-4}$alkenyl.

Similarly, as a component of a mixture of dyes, EP-A-0347685 discloses a dye of the formula

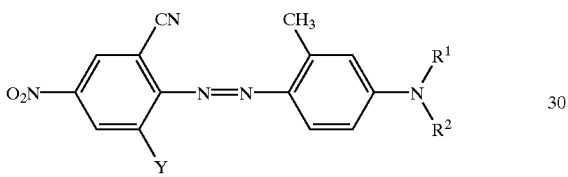

wherein Y is $NO_3$ or CN, $R^1$ is alkyl aralkyl alkoxyalkyl or alkenyl and $R^2$ is alkyl, aralkyl, alkoxyalkyl, alkenyl, chloroalkyl, aryloxyalkyl or alkoxycarbonyalkyl. Such dyes are in admixture with, for example, monoazo-dyes containing a thiophene nucleus.

WO-A-97004030 discloses mixtures of the following dye with a thiophene dye in various proportions.

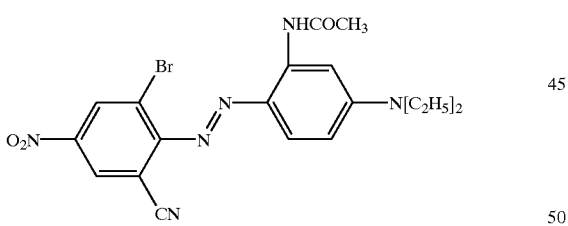

Dyes of the abovementioned pyrroline type are disclosed, for example, in U.S. Pat. No. 3,013,013, U.S. Pat. No. 3,013,018, GB-A-2191498, EP-A-0327077, EP-A-0511625 and WO-A-94010248.

In particular, WO-A-94010248 discloses dyes of the pyrroline type having the formula (1).

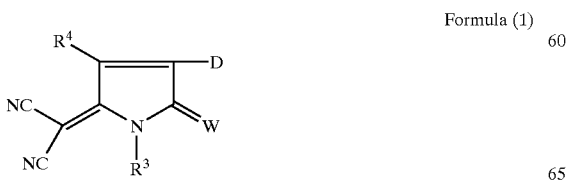

Formula (1)

wherein:

D is a group of the Formula (2)

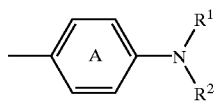

Formula (2)

or a group of Formula (3):

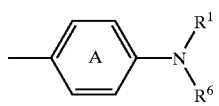

Formula (3)

or a group of the Formula (4)

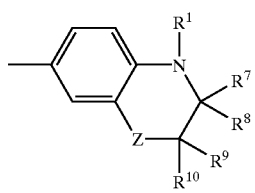

Formula (4)

$R^1$ is alkyl, cycloalkyl, aryl, a kenyl or aralkyl each of which may be optionally substituted;

$R^2$ is optionally substituted $C_{7-20}$-alkyl; or $R^1$ and $R^2$ together with the nitrogen atom to which they are attached form a pyrrolidino or piperidino ring;

$R^3$ is alkyl, alkenyl or aralkyl each of which may be optionally substituted, —$SO_2$alkyl, —$SO_2$aryl, or —COR in which R is —H or alkyl, phenyl, cycloalkyl or aralkyl each of which may be optionally substituted or —H; and $R^4$ is an electron withdrawing group;

$R^6$ is optionally substituted $C_{1-14}$-alkyl; or $R^1$ and $R^6$ together with the nitrogen atom to which they are attached form a pyrrolidino or piperidino ring;

$R^7$, $R^8$, $R^9$ and $R^{11}$ each independently is alkyl, cycloaklyl, aryl, alkenyl or aralkyl, each of which may be optionally substituted, or —H;

W is oxygen or sulphur;

Z is a direct link or N—$R^{11}$ in which $R^{11}$ is —H or optionally substituted alkyl or aryl;

Ring A is unsubstituted apart from the —$NR^1R^2$ group or is substituted by from 1 to 4 further groups; and Ring B is unsubstituted or substituted by from 1 to 3 groups; except for 3-(4-(N,N-di-n-octylamino)phenyl)-4-cyano-5-dicyano methylidene-2-oxo-2,5-dihydropyrrole provided that:

(a) when D is a group of Formula (3), $R^1$ and $R^6$ are different and $R^1$ is not —$C_2H_5$, —$C_3H_7$ or —$C_1H_9$ when $R^6$ is —$C_2H_4$phenyl, —$C_3H_6$phenyl and ethyl substituted by —OH, —CN, —$OCH_3$, —$OC_2H_4OC_2H_5$, —$NHCOCH_2$ —Ophenyl and —$NHSO_2CH_3$; or (b) at least one of $R^1$ and $R^6$ is branched chain alkyl. Commercially available dyes of the pyrroline type are, for example, dyes of the formula:

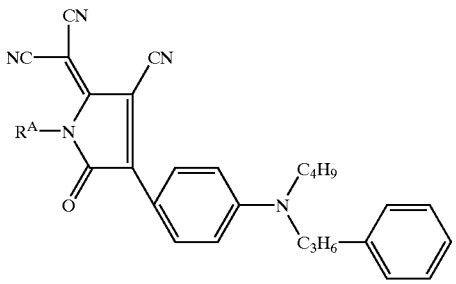

where $R^A$ is H (Kayalon Polyester Brilliant Blue F2B-S); or $CH_2CH=CH_2$ (Kayalon Polyester Blue-Green FG-S); and dyes of the formula

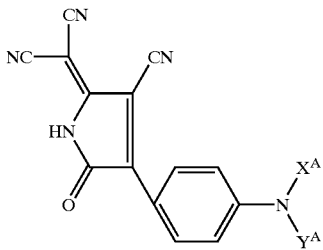

where $X^A$ is $C_4H_9$ and $Y^A$ is $CH(CH_3)C_5H_{11}$.

It is found that certain mixtures, although giving bright shades on polyester when viewed in normal daylight, tend to exhibit a "red" flare in tungsten light which is a serious commercial disadvantage.

Although the problem of "flare" may be solved by at least one of the mixtures disclosed in EP-A-0347685, such a mixture is especially sensitive to reduction and has a relatively low heat fastness. Likewise flare can be avoided by using a dye mixture in which the nitrothiophene carries an acetyl group. However, such dyes tend to be expensive.

We have found surprisingly that a mixture of dyes, as defined below, surprisingly not only allows reduction or even elimination of the "red" flare, but provides a much brighter shade and is less sensitive to reduction with consequent loss of shade.

Thus, the invention provides a mixture of dyestuffs containing at least (A) at least one monoazo dye of the formula (I)

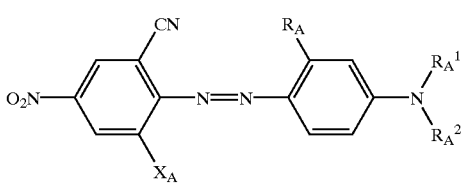

(I)

wherein $X_A$ is Cl, Br, I, CN or $NO_2$;

$R_A$ is $C_{1-4}$alkyl (or NHCOQ, where Q is $C_{1-4}$alkyl); and each of $R_A^1$ and $R_A^2$ independently is $C_{1-4}$alkyl, $C_{2-4}$alkenyl, $C_{1-4}$-alkoxy $C_{1-4}$alkyl, aryl-$C_{1-4}$alkyl or aryloxy-$C_{1-4}$alkyl; and (B) at least one dye of the formula (II)

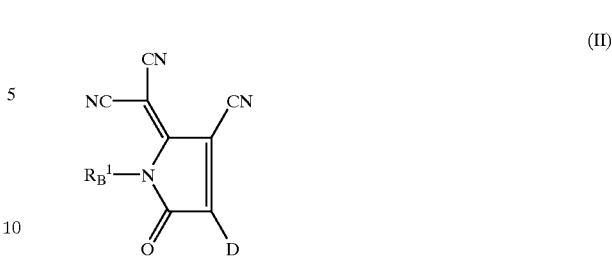

(II)

wherein $R_B^1$ is H, $C_{1-20}$alkyl or $C_{2-20}$alkenyl; and
D is aryl.

In a preferred dye mixture, in a dye of the formula (I) of the mixture, an especially preferred value of $X_A$ is Br or CN, especially preferred values of $R_A$ are $NHCOCH_3$, $NHCOC_2H_5$, $CH_3$ and $C_2H_5$ and especially preferred values $R_A^1$ and $R_A^2$ are methyl, ethyl and allyl.

Typical especially preferred components (A) in mixtures embodying the invention are selected from (A1) a monoazo dye of the formula (I), wherein $X_A$ is Br, $R_A$ is $NHCOR^X$ where $R^X$ is methyl or ethyl and each of $R_A^1$ and $R_A^2$ is ethyl;

(A2) a monoazo dye of the formula (I wherein $X_A$ is CN, $R_A$ is $CH_2$ and each of $R_A^1$ and $R_A^2$ is ethyl; and (A3) a monoazo dye of the formula (I), wherein $X_A$ is CN, $R_A$ is $CH_2$, $R_A^1$ is methyl and $R_A^2$ is 3-phenylpropyl.

The dyes of the formula (I) may be Prepared in a conventional manner by diazotisation and coupling.

More particularly, for dyes wherein, in formula (I), $X_A$ is Cl, Br or I, an amine of formula (III)

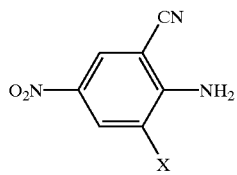

(III)

wherein X is
Cl, Br, or I, is dlazotised and coupled with a coupling component of the formula (V)

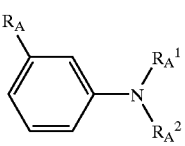

(V)

wherein $R_A$, $R_A^1$ and $R_A^2$ are as defined above

Dyes of the formula (I), wherein $X_A$ is CN may be prepared by diazotizing 2,6-dibromo-4-nitroaniline and coupling to a coupling component of the formula (V) to form a precursor dye and thereafter subjecting the precursor dye to a copper catalysed cyano exchange reaction using, for example, copper cyanide or a mixture of copper and sodium cyanides, optionally in a solvent such as dimethyl formamide.

Similarly, dyes of the formula (I), whereon $X_A$ is $NO_2$ may be prepared by diazotizing 2-dibromo-4,6-dinitroaniline, coupling to a coupling component of the formula (V) and then subjecting the resulting precursor dye to the above copper catalysed cyano exchange reaction.

In the above diazotisation and coupling reactions, the diazotization is carried out using a diazotising agent, which is preferably nitrosyl sulphuric acid, optionally diluted with glacial acetic acid or a phosphoric/acetic acid mixture and preferably at a temperature of 0–10° C., more preferably 0–5° C. and preferably at a pH<1 (say 0.5) up to 7, more preferably 0.5–1, followed by a subsequent increase in pH to 3–4 to isolate the dye.

Reference is now made to component (B), which comprises a pyrroline type dye of the formula (II).

In the compound of the formula (II), D is preferably a group of the formula (a).

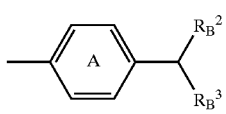

(a)

wherein each of $R_B^2$ and $R_B^3$ independently is alkyl, cycloalkyl, aryl, alkenyl or aralkyl.

In the above formula (II), the alkyl group represented by any of $R_B^1$–$R_B^3$ is preferably a $C_{1-20}$-alkyl, more preferably a $C_{1-12}$-alkyl and especially a $C_{1-8}$-alkyl, group. The cycloalkyl group represented by $R_B^2$ or $R_B^3$ is preferably a $C_{4-8}$-cycloalkyl and more preferably a cyclohexyl group. The aryl group represented by $R_B^2$ or $R_B^3$ is preferably phenyl. The alkenyl group represented by any of $R_B^1$–$R_{B3}$ is preferably a $C_{2-10}$-alkenyl, more preferably $C_{2-6}$-alkenyl and especially a $C_{2-3}$-alkenyl group, such as allyl. The aralkyl group represented by any one of $R_B^1$–$R_B^3$ is preferably a phenyl-$C_{1-6}$-alkyl, more preferably a phenyl-$C_{1-3}$-alkyl, especially phenylethyl or 3-phenylpropyl.

The alkyl group represented by $R_B^3$ is more preferably a $C_{7-15}$-alkyl, still more preferably a $C_{7-12}$-alkyl and especially a $C_{7-9}$-alkyl group.

The alkyl group represented by $R_B^1$ is more preferably a $C_{1-6}$-alkyl and still more preferably $C_{1-4}$-alkyl group.

$R_B^1$ is especially preferably —H, $C_{1-4}$-alkyl or $C_{2-3}$alkenyl, more preferably —H or $C_{1-4}$-alkyl and especially —H.

D is preferably a group of Formula (a).

The alkyl groups represented by any of $R_B^1$–$R_B^3$ may be straight or branched chain alkyl groups. $R_B^2$ is preferably $C_{1-12}$-alkyl more preferably $C_{1-8}$-alkyl especially unsubstituted $C_{1-8}$alkyl. $R_B^3$ may be $C_{7-12}$-alkyl and preferably $C_{7-9}$-alkyl, especially unsubstituted $C_{7-9}$-alkyl or may be unsubstituted $C_{1-6}$-alkyl. Where D is a group of Formula (a) it is preferred that one or both of $R_B^2$ and $R_B^3$ is branched, more preferably branched at an α- or β-, i.e., 1- or 2-, position. It is preferred that $R_B^2$ and $R_B^3$ are different. It is also preferred that ring A is unsubstituted apart from the $NR_B^2R_B^3$ group.

A preferred sub-group of dyes of Formula (I) is that in which D is a group of Formula (a):
$R_B^1$ is alkyl or —H;
$R_B^2$ is alkyl;
$R_B^3$ $C_{7-20}$-alkyl; and
Ring A is unsubstituted apart from the $NR_B^2R_B^3$ group.

Another preferred sub-group of dyes of Formula (II) is that in which D is a group of the Formula (a);
$R_B^1$ is —H or alkyl;
$R_B^2$ is unsubstituted $C_{1-8}$-alkyl;
$R_B^3$ is unsubstituted $C_{1-6}$-alkyl;
Ring A is unsubstituted apart from the —$NR_B^2R_B^3$ group; and $R_B^2$ and $R_B^3$ are different or at least one of $R_B^2$ and $R_B^3$ is a branched chain alkyl.

An especially preferred sub-group of dyes of Formula (II) is that in which D is a group of Formula (a):
$R_B^1$ is —H;
$R_B^2$ is unsubstituted $C_{1-8}$alkyl;
$R_B^3$ is unsubstituted $C_{7-9}$alkyl; and
Ring A is unsubstituted apart from the $NR_B^2R_B^3$ group.

A further especially preferred sub-group of dyes of Formula (II) is that in which D is a group of Formula (a);
$R_B^1$ is —H;
$R_B^2$ is n-propyl or n-butyl;
$R_B^3$ is 1-methylhexyl or 2-ethylhexyl; and
Ring A is unsubstituted apart from the —$NR_B^2R_B^3$ group;

Typical especially preferred mixtures of components (B) in mixtures embodying the invention are selected from
(B1) a pyrroline type dye of the formula (II), wherein $R_B^1$ is H, $R_B^2$ is $C_4H_9$ and $R_B^3$ is 1-methyl-n-hexyl (B$^1$) or a mixture thereof with up to 10%, by weight of component (B1), of a pyrroline type dye B2) of the formula (II), wherein $R_B^1$ is H and each of $R_B^2$ and $R_B^2$ is $C_4H_9$;
(B2) a pyrroline type dye of the formula (II), wherein $R_B^1$ is H, $R_B^2$ is ethyl and $R_B^3$ is n-octyl (B$^3$), or 2-ethyl-n-hexyl (B$^4$) or a mixture of dyes (B$^3$) and (B$^4$); and
(B3) a pyrroline type dye of the formula (II), wherein $R_B^2$ is $C_4H_9$, $R_B^3$ is phenylpropyl and $R_B^1$ is H (B$^5$) or allyl (B$^6$) or a mixture of dyes (B$^5$) and (B$^6$).

When $R_B^1$ is H, dyes of Formula (II) may exist in a tautomeric form represented by Formula (IIA):

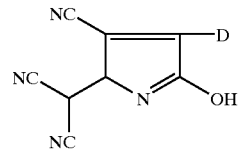

Formula (IIA)

wherein D is as hereinbefore defined.

The dyes of Formula (II) where D is a group of Formula (a) may be prepared by reaction of an aniline of Formula (III):

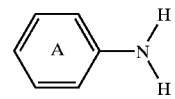

Formula (III)

in which Ring A is as hereinbefore defined, firstly with a compound of Formula $R_B^2X_B$ in which $R_B^2$ is as hereinbefore defined and $X_B$ is a halogen such as —Cl, —Br or —I or other leaving group, such as a tosylate, mesylate or alkylsulphonate, in the presence of a base such as an alkali metal carbonate or alkaline earth metal carbonate such as $K_2CO_3$ or $CaCO_3$ and secondly with a compound of formula, $R_B^3X$ in which $R_B^3$ and X are as hereinbefore defined in the presence of a base as above to form an aromatic amine of Formula (IV);

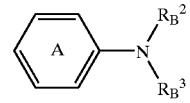

Formula (IV)

Alternatively the aromatic amine of the Formula (IV) may be prepared by reductive alkylation of the aniline of Formula (III) with an appropriate ketone or aldehyde. The reductive alkylation may be performed in an inert liquid medium such as an alcohol or ester optionally in the presence of an acid such as an aliphatic carboxylic acid, for example, acetic and propionic acids and aromatic sulphonic acid e.g. 4-toluenesulphonic acid using a metal or supported metal catalyst such as palladium or platinum on carbon and hydrogen, optionally at elevated temperature and pressure. Alternatively, reducing agents such as sodium borohydride may be used. After the reductive alkylation a second alkyl group may be introduced as described above.

The aromatic amine of Formula (IV) is then reacted with a 3-halopyrrole of Formula (V):

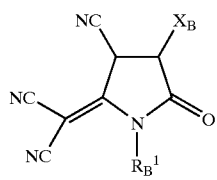

Formula (V)

in which $R_B^1$ is as hereinbefore defined and $X_B$ is preferably a halogen such as —Cl or Br to form a compound of Formula (II). The reaction may be performed in a liquid medium such as N,N-dimethylformamide, N,N-dimethylacetamide, dimethylsulphoxide, suldholane, N-methylpyrrolidone, acetonitrile, toluene or tetrahydrofuran or any mixture thereof and at a temperature from −20° C. to 50° C. The product may be isolated by any convenient means such as pouring the reaction mixture into a mixture of ice and water and recovering the precipitated product by filtration. The product may be purified by any convenient means such as trituration or recrystallisation from organic liquids particularly alkanols such as methanol, ethanol and esters such as ethylacetate or mixtures thereof.

The 3-halo-2-oxopyrrole of Formula (V) may be prepared by halogenation of a compound which may be represented by Formulae (VI), (VI$^1$) and (VI$^2$)

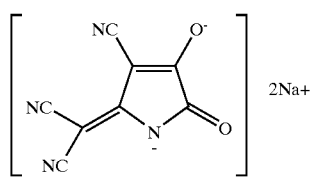

Formula (VI)

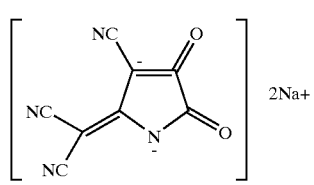

Formula (VI$^1$)

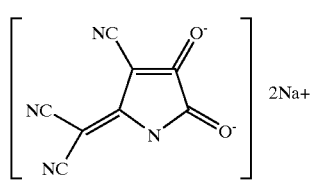

Formula (VI$^2$)

with a halogenating agent such as phosphorus oxychloride, phosphorus trichloride, phosphorus pentachloride, thionyl chloride or phosgene at a temperature of from −20° C. to 50° C. in a liquid medium such as N,N-dimethylformamide, N,N-diethylacetamide, dimethylsulphoxide, sulpholane, N-methylpyrrolidone, acetonitrile or tetrahydrofuran. The product may be used without isolation with improvement in yield in the preparation of compounds so Formula (II) described above or may be isolated by evaporating the liquid medium.

Alternatively a compound of Formula (IV) may be reacted directly with the compound represented by Formulae (VI), (VI$^1$) or (VI$^2$) in a liquid medium such as toluene in the presence of a halogenating agent such as phosphorus oxychloride.

The compounds represented by Formulae (VI) or (VI$^1$) may be prepared by reaction of diethyloxalate with a compound for Formula (VII);

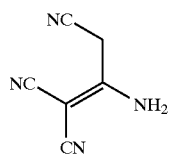

Formula (VII)

in the presence of a base such as an alkali metal alkoxide preferably a sodium or potassium $C_{1-6}$-alkoxide and especially sodium or potassium methoxide, ethoxide, n- or iso-propoxide, n-, iso- or, tertiary-butoxide in a liquid medium, preferably an alkanol such as methanol, ethanol, n- or iso-propanol or n-, iso- or tertiary-butanol, at a temperature of from 10° C. to 60° C. The product may be isolated by cooling the reaction mixture and collection by filtration.

The compound of Formula (VII) may be prepared by dimerization of malononitrile of Formula (VIII):

 NCCH$_2$CN          Formula (VIII)

by reaction with a base such as sodium methoxide in a liquid medium such as methanol at a temperature of from −20° C. to 60° C. The product may be isolated by filtration.

A dye of Formula (II) in which $R_B^1$ is other than —H may be prepared by reaction of the corresponding dye of Formula (II) in which $R_B^1$ is —H in a liquid medium, preferably an amide such as dimethylformamide or an ether such as tetrahydrofuran or diethylether in the presence of a base, preferably an alkali metal carbonate such as potassium carbonate or an alkali metal hydride such as sodium hydride at a temperature of 0° C. to 120° C. with an appropriate alkylating or acylating agent. Where $R_B^1$ is alkyl an appropriate alkylating agent is an alkyl halide, preferably an alkyl iodide, bromide or chloride. Where $R_B^1$ is alkenyl an appropriate alkylating agent is an alkenyl halide, preferably an alkenyl bromide. These dyes may be isolated by evaporating the liquid medium or by filtration from the reaction mixture.

As previously mentioned, component (B) may be a mixture of two or more dyes of Formula (II) wherein $R_B^1$ to $R_B^3$ inclusive, D and Ring A are as hereinbefore defined.

In general, in a preferred mixture of components (A) and (B), the ratio, by weight, of component (A): component (B) may be from 95:5 to 80:20 inclusive, for example from 85:15 to 35:65 inclusive, or from 70:30 to 40:60, depending upon the choice of dyestuff.

In especially preferred mixtures of components (A) and (B), component (A) is selected from, (A1) a monoazo dye of the formula (I), wherein $X_A$ is Br, $R_A$ is NHCOR$^X$ where R$^X$ methyl or ethyl and each of $R_A^1$ and $R_A^2$ is ethyl;

(A2) a monoazo dye of the formula (I), wherein $X_A$ is CN, $R_A$ is $CH_3$ and each of $R_A^1$ and $R_A^2$ is ethyl; and (A3) a monoazo dye of the formula (I), wherein $X_A$ is CN, $R_A$ is $CH_3$, $R_A^1$ is methyl and $R_A^2$ is 3-phenylpropyl; and component (B) is selected from (B1) a pyrroline type dye of the formula (II), wherein $R_B^1$ is H, $R_B^2$ is $C_4H_9$ and $R_B^3$ is 1-methyl-n-hexyl ($B^1$) or a mixture thereof with up to 10%, by weight of component (B1), of a pyrroline type dye ($B^2$), of formula (II), wherein, $R_B^1$ is H, and each of $R_B^2$ and $R_B^3$ is $C_4H_9$; or (B2) a pyrroline type dye of the formula (II), wherein $R_B^1$ is H, $R_B^2$ is ethyl and $R_B^3$ is n-octyl ($B^3$), or 2-ethyl-n-hexyl ($B^4$) or a mixture of dyes ($B^3$) and ($B^4$); or (B3) a pyrroline type dye of the formula (II), wherein $R_B^2$ is $C_4H_9$, $R_B^3$ is 3-phenylpropyl and $R_B^1$ is H ($B^5$) or allyl ($B^6$) or a mixture of dyes ($B^5$) and ($B^6$).

Especially preferred compositions are the following two component mixtures:

(1) Component (A1)

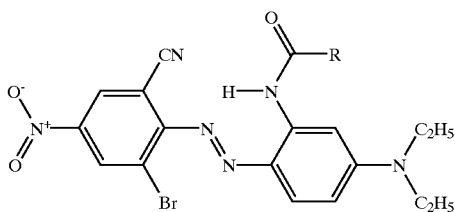

where R is $CH_3$ and/or $C_2H_5$.

[the dye wherein R is ethyl is commercially available as C.I. Disperse Blue 183]; and Component (B1)

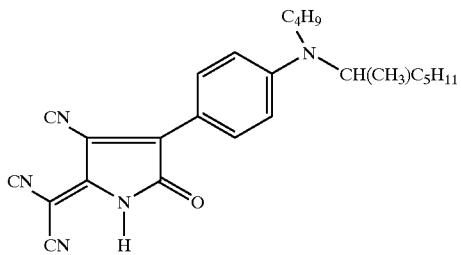

[which dye may contain up to 10% by weight of the corresponding N,N-dibutyl compound];

(2) Component (A2)

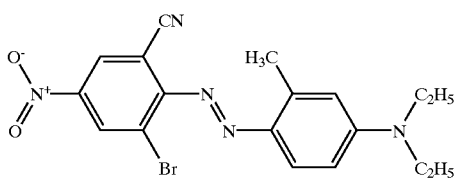

[available commercially as C.I. Disperse Blue 366] and Component (B1)

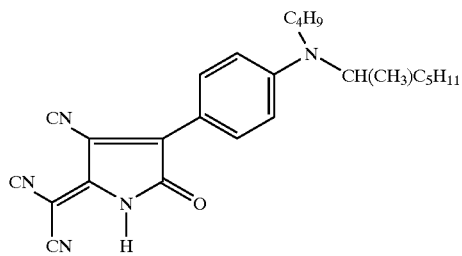

[as in the above mixture]; and (3) Component (A3)

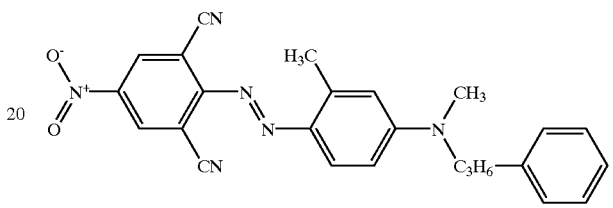

[commercially available as C.I. Disperse Blue 368] and Component (B1)

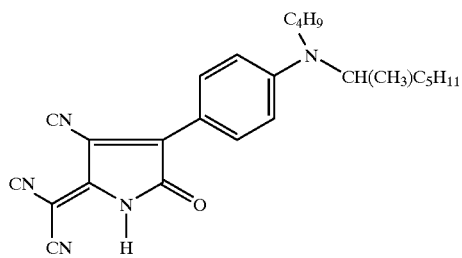

[as in each of the above mixtures].

More especially preferred are mixture (1) of components (A1) and (B1) in the ratio of 30:10 to 60:40 by weight, mixture (2) of components (A2) and (B1) in the ratio of 70:30 to 40:60 by weight and mixture (3) of components (A3) and (B1) in the ratio of 70:30 to 40:60 by weight.

A mixture embodying the invention of at least one dye of formula (I) (Component A) and at least one dye of the formula (II) (Component B) may additionally comprise at least one other dye (Component C), especially a yellow, orange, red or brown dye capable of producing a navy or black shade.

Mixtures embodying the invention can be prepared by a number of methods including (1) Co-crystallisation Typically, the dyes are dissolved in a hot solvent, for example, by placing the dyes in a suitable solvent and heating up to the reflux temperature of the solvent until the dyes are dissolved, thereafter filtering to provide a solution, and then allowing the solution to cool and crystals to form. The resultant mixture may then undergo further processing, such as milling and spray drying. Examples of suitable solvents for this process are organic solvents such as aromatic hydrocarbons, chlorinated hydrocarbons, aliphatic hydrocarbons, alicyclic hydrocarbons, alcohols, amides, sulphoxides, esters, ketones and ethers. Specific examples of organic solvents are toluene, ethyl cellosolve, acetone, chlorobenzene, pyridine, dimethyl formamide, dimethylsulphoxide, ethyl acetate, benzene, tetrahydrofuran and cyclohexane.

(2) Co-milling
  (a) The dyes are mixed and then milled together to give an intimate blend which is then spray dried to give a solid mixture; or
  (b) each dye is milled separately and then mixed in the required ratio before spray drying.

(3) Dry Blending
  Each dye is spray dried separately and then mixed in the required ratio by a dry blending process.

The mixtures give an especially bright shade without exhibiting a red flare in tungsten light. The mixtures have high colour strength and can be readily and cost-effectively formulated.

Mixtures embodying the invention provide especially useful disperse dyes valuable for colouring synthetic textile materials and fiber blends thereof by exhaust dyeing, padding or printing, and may be formed into dispersions for this purpose. They may also be used in, for example, ink jet printing of textiles and non-textiles, dye diffusion, thermal transfer printing and in the colouration of plastics.

According to other aspects, the invention provides a composition comprising at least the dye mixture and a dispersing agent, surfactant or wetting agent, suitable for providing such a dispersion and also a process for colouring a synthetic textile material or fibre blend thereof which comprises applying to the synthetic textile material or fibre blend a mixture comprising at least one dye of the formula (I) and at least one dye of the formula (II).

The synthetic textile material may be selected from aromatic polyester, especially polyethylene terephthalate, polyamide, especially polyhexamethylene adipamide, secondary cellulose acetate, cellulose triacetate, and natural textile materials, especially cellulosic materials and wool. An especially preferred textile material is an aromatic polyester or fibre blend thereof with fibres of any of the above mentioned textile materials. Especially preferred fibre blends include those of polyester-cellulose, such as polyester-cotton, and polyester-wool. The textile materials or blends thereof may be in the form of filaments, loose fibres, yarn or woven or knitted fabrics.

The mixtures of dyes of formulae (I) and (II) optionally in conjunction with other disperse dyes may be applied to the synthetic textile materials or fibre blends by processes which are conventionally employed in applying disperse dyes to such materials and fibre blends.

Suitable process conditions may be selected from the following (I) exhaust dyeing at a pH of from 4 to 6.5, at a temperature of from 125° C. to 140° C. for from 10 to 120 minutes and under a pressure of from 1 to 2 bar, a sequestrant optionally being added;

(ii) continuous dyeing at a pH of from 4 to 6.5, at a temperature of from 190° C. to 225° C. for from 15 seconds to 5 minutes, a migration inhibitor optionally being added;

(iii) direct printing at a pH of from 4 to 6.5, at a temperature of from 160° C. to 185° C. for from 4 to 15 minutes for high temperature steaming, or at a temperature of from 190° C. to 225° C. for from 15 seconds to 5 minutes for bake fixation with dry heat or at a temperature of from 120° C. to 140° C. and 1 to 2 bar for from 10 to 45 minutes for pressure steaming, wetting agents and thickeners (such as alginates) of from 5 to 100% by weight of the dye optionally being added;

(iv) discharge printing (by padding the dye on to the textile material, drying and overprinting) at a pH of from 4 to 6.5, migration inhibitors and thickeners optionally being added;

(v) carrier dyeing at a pH of from 4 to 6.5, at a temperature of from 95° C. to 100° C. using a carrier such as methylnaphthalene, diphenylamine or 2-phenylphenol, sequestrants optionally being added; and (vi) atmospheric dyeing of acetate, triacetate and nylon at a pH of from 4 to 6.5, at a temperature of 85° C. for acetate or at a temperature of 90° C. for triacetate and nylon for from 15 to 90 minutes, secuestrants optionally being added.

In all the above processes, the dye mixture may be applied as a dispersion comprising from 0.001% to 6, preferably from 0.005 to 4%, of the dye mixture in an aqueous medium.

A particular aspect of the invention provides a composition comprising a mixture of dyes (I) and (II), optionally at least one other disperse dye and, additionally, optionally at least one further ingredient conventionally used in colouring applications such as a dispersing agent, surfactant or wetting agent. The composition topically comprises from 1% to 65%, preferably 10 to 60%, more preferably 20 to 55%, of the total dye mixture in a liquid, preferably an aqueous, or solid medium. Liquid compositions are preferably adjusted to pH 2 to 7, more preferably pH 4 to 6.

Typical examples of dispersing agent are lignosulphonates, naphthalene sulphonic acid/formaldehyde condensates and phenol/cresol/sulphanilic acid/formaldehyde condensates, typical examples of wetting agent are alkyl aryl ethoxylates which may be sulphonated or phosphated and typical examples of other ingredients which may be present are inorganic salts, de-foamers such as mineral oil or nonanol, organic liquids and buffers. Dispersing agents may be present at from 10% to 200% on the weight of the dye mixtures. Netting agents may be used at from 0% to 20% on the weight of the dye mixtures.

The compositions may be prepared by bead milling the dye mixture with glass beads or sand in an aqueous medium. The compositions may have further additions of dispersing agents, fillers and other surfactants and may be dried, by a technique such as spray drying, to give a solid composition comprising from 5% to 65% of dyestuff.

In addition to the above-mentioned application processes, the dye mixtures may be applied to synthetic textile materials and fibre blends by ink-jet printing, the substrates optionally having been pre-treated to aid printing. For ink-jet applications, the application medium may comprise water and a water-soluble organic solvent, preferably in a weight ratio of 1:99 to 99:1, more preferably 1:95 to 50:50 and especially in the range 10:90 to 40:60. The water-soluble organic solvent preferably comprises a $C_1$–$C_4$-alkanol, especially methanol or ethanol, a ketone, especially acetone or methyl ethyl ketone, 2-pyrrolidone or N-methylpyrrolidone, a glycol, especially ethylene glycol, propylene glycol, trimethylene glycol, butane-2,3-diol, thiodiglycol or diethylene glycol, a glycol ether, especially ethylene glycol monomethyl ether, propylene glycol monomethyl ether or diethylene glycol monomethyl ether, urea, a sulphone, especially bis-(2-hydroxyethyl)sulphone or mixtures thereof.

The dye mixtures may also be applied to textile materials using supercritical carbon dioxide, in which case the dye formulating agents may optionally be omitted.

Embodiments of the present invention will now be described in more detail with reference to the following Examples, in which parts are by weight unless otherwise stated.

EXAMPLES 1–2 PREPARATION FOR INDIVIDUAL DYES

EXAMPLE 1

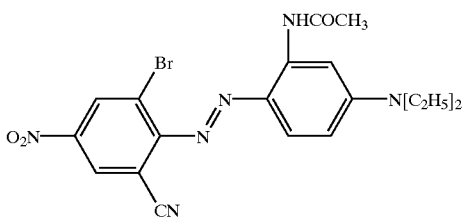

2-bromo-4-nitro-6-cyanoaniline (24 parts) was stirred at 0–5° C. with a mixture of acetic/propionic acids (100 parts, 86:14). Nitrosyl sulphuric acid (35 parts, 40% solution in $H_2SO_4$) was added gradually at 0–5° C. and the mixture was stirred at that temperature for 60 mins. The diazo solution was added to a coupling mixture of N,N-diethyl-m-aminoacetanilide (21.6 parts), water (100 parts), conc. sulphuric acid (20 parts) and sulphamic acid (7 parts), stirring at 0–5° C.

After stirring for a further 2 hours, the product was isolated by filtration, washed with cold water and dried at 50° C. Yield 39 parts.

EXAMPLE 2

Preparation of 3-(4-(N-Butyl-N-(1-methylhexyl) amino)phenyl)-4-cyano-5-dicyanomethylidene-2-oxo-2,5-dihydropyrrole i) A mixture of aniline (100 parts), 2-heptanone (220 parts), 4-toluene sulphonic acid (6 parts) and 3% palladium on carbon (5 parts) in a 1 liter autoclave was charged with hydrogen to a pressure of SO atmospheres and heated at 150° C. for 40 hours. The cooled reaction mixture was diluted with ethyl acetate, filtered, washed with 1N-hydrochloric acid (6×200 parts) and water (2×200 parts), the ethyl acetate was separated and dried ($MgSO_4$) before evaporating to leave N-(1-methylhexyl) aniline (76 parts, 37%).

ia) In an alternative procedure, N-(1-methylhexyl)aniline was prepared as follows: To an ice cooled, stirred mixture of aniline (28 parts), heptan-2-one (69 parts) and propionic acid (9 parts) was added sodium borohydride (9.8 parts) portionwise at such a rate as to keep the temperature less than 5° C. The reaction mixture was allowed to warm up to room temperature and stirred overnight. The reaction mixture was poured into an ice water mixture and extracted with ethyl acetate. The organic phase was washed with water, 2% hydrochloric acid and water. The dried organic phase was evaporated to leave N-(1-methylhexyl)aniline (53.5 parts, 93%).

ii) A mixture of N-(1-methylhexyl)aniline (76 parts) 1-bromobutane (66 parts), anhydrous potassium carbonate (65 parts) and DMF (150 parts) was stirred while heating under reflux for 41 hours. An additional quantity of 1-bromo butane (44 parts) was added and the mixture stirred while heating under reflux for a further 19 hours. The cooled mixture was poured into water (400 parts) and the organic phase separated. The aqueous phase was extracted with toluene, the organic phases and toluene extract were combined and washed with water (2×100 arts) before evaporating to leave N-butyl-N-(1-methylhexyl)aniline (72.8 parts, 44%) which was purified by vacuum distillation to give N-butyl-N-(1-methylhexyl)aniline b.pt 73–80° C., 2.6 mm Hg.

iia) In an alternative procedure, N-butyl-N-(1-methylhexyl)aniline was prepared as follows:

A mixture of N-butylaniline (7.45 Darts), anhydrous potassium carbonate (7.5 parts), 2-bromcheptane (13.5 parts) and DMF (25 parts) was stirred a 130° C. for 86 hours. The reaction mixture was poured into water, saturated with salt and extracted with ethyl acetate. The organic phase was washed with water, dried ($MgSO_4$) and evaporated to leave N-butyl-N-(1-methylhexyl)aniline (11.8 parts, approximately 60% strength). This material had acetic anhydride (10 parts) added to it prior to further use.

iii) A stirred mixture of the disodium salt of 4-cyano-5-dicyanomethylidene-3-hydroxy-2-oxo-2,5-dihydropyrrole (23 parts) and dry N,N-dimethylformamide (130 parts) was cooled to –5° C. to –10° C. and N-n-butyl-N-1-methylhexyl) aniline containing acetic anhydride (27%, 37 parts) was added followed by the dropwise addition of phosphorous on chloride (26 parts) whilst maintaining the temperature at less than –5° C. The mixture was allowed to warm to room temperature and stirred for 20 hours. The reaction mixture was poured into a stirred mixture of ice and water (400 parts) and acetone (400 parts) was added before filtering off a solid. The solid was washed repeatedly with warm water (40° C.) and then dried at 50° C. to yield 3-(4-(N-butyl-N-(1-methylhexyl)amino)phenyl)-4-cyano-5-dicyanomethylidene-2-oxo-2,5-dihydropyrrole (26.8 parts, 65%). A small sample of this material was slurried in boiling methanol, collected by filtration, washed with methanol and dried at 50° C. to give 3-(4-(N-n-butyl-N-(1-methylhexyl) amino)phenyl)-4-cyano-5-dicyanomethylidene-2-oxo-2,5-dihydropyrrole m.p.180° C.; $\lambda$max ($CH_2Cl_2$) 662 nm ($\epsilon$ max 60231); M/Z (EI) 415 ($M^+$, 20%), 400 (15), 372 (12), 344 (100) 288 (33) and 272 (25).

EXAMPLES 3–4 PREPARATION OF MIXTURES

EXAMPLE 3

A mixture of 34.3 parts of Component (A1), wherein $R^x$ is methyl, and 6.75 parts of Component (B1) is prepared by mixing the two dyes together and milling them as a 40% aqueous slurry with 20 parts of a high temperature stable dispersing agent until the dye particle size (mean diameter) is in the range of 0.1–5 microns.

This dispersion is standardised to a liquid brand containing 20.5% of the mixture, by the addition of 6.5 parts of a humectant and water (to 100 parts). This liquid is especially suitable for use in the direct printing and continuous dyeing of polyester and polyester/cellulose blends and can also be used for exhaust dyeing.

The same dispersion is standardised to a solid brand containing 41% of the mixture and 59% dispersing agent, by the addition of the 39 parts of a temperature stable dispersing agent and drying to either a grain or powder form in a spray dryer. This product is especially suitable for the exhaust dyeing of polyester, polyester/cellulose and polyester/wool blends and can also be used for continuous dyeing and direct printing.

A dyebath for the exhaust dyeing of polyester in piece form is prepared by adding 3 mls of an aqueous dispersion of the solid brand (1 g dye in 100 ml water at 40–50° C.) to 55.8 ml of de-ionised water and 1.2 ml of buffer solution. To this dyebath is added a 5 g piece of polyester and the whole is held for 45 minutes at 130° C. in a Werner Mathis Labomat high temperature dyeing machine. After rinsing with water and a reduction clearing treatment, the material is dyed a bright reddish blue shade which appears almost

EXAMPLE 4

A mixture of 19.7 parts of Component (A2) and 12.17 parts of Component (B1) is prepared by mixing the two dyes together and milling them as a 40% aqueous slurry with 20 parts of a high temperature stable dispersing agent until the dye particle size (mean diameter) is in the range 0.1–5 microns.

The dispersion is standardised to a solid brand containing 31.9% of the mixture and 68.1% dispersing agent, by the addition of 48.1 parts of a high temperature stable dispersion agent and drying to either a grain or powder form in a spray dryer. This product is especially suitable for the exhaust dyeing of polyester, polyester/cellulose and polyester/wool blends and can also be used for continuous dyeing and direct printing.

A dyebath for the exhaust dyeing of polyester in piece form is prepared by adding 3 mls of an aqueous dispersion of the solid brand (1 g dye in 100 ml water at 40–50° C.) to 55.8 ml of de-ionised water and 1.2 ml of buffer solution. To this dyebath is added a 5 g piece of polyester and the whole is held for 45 minutes at 130° C. in a Werner Mathis Labomat high temperature dyeing machine. After rinsing with water and a reduction clearing treatment, the material is dyed a bright reddish blue shade which appears almost identical when viewed under both normal daylight and tungsten light sources.

What is claimed is:

1. A dye mixture comprising (A) at least one monoazo dye of the formula (I)

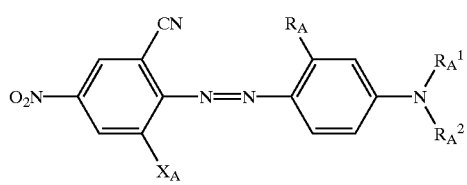

wherein $X_A$ is Cl, Br, I, CN or NO$_2$;

$R_A$ is $C_{1-4}$alkyl or NHCOQ, where Q is $C_{1-4}$alkyl; and each of $R_A^1$ and $R_A^2$, independently is $C_{1-4}$alkyl, $C_{2-4}$alkenyl, $C_{1-4}$alkoxy-$C_{1-4}$alkyl, aryl-$C_{1-4}$ alkyl or aryloxy-$C_{1-4}$alkyl; and (B) at least one pyrroline type dye of the formula (II)

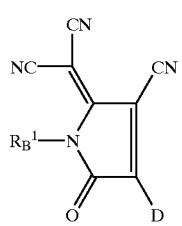

wherein $R_B^1$ is H, $C_{1-20}$alkyl or $C_{2-20}$alkenyl; and

D is a group of the formula (a)

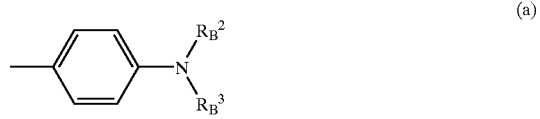

wherein each of $R_B^2$ and $R_B^3$ independently is alkyl, cycloalkyl, aryl, alkenyl or aralkyl.

2. A dye mixture according to claim 1, wherein, in a dye of the formula (I) of the mixture, $X_A$ is Br or CN, $R_A$ is NHCOCH$_3$, NHCOC$_2$H$_5$, CH$_3$ or C$_2$H$_5$ and each of $R_A^1$ and $R_A^2$ independently is methyl, ethyl or allyl.

3. A composition comprising a dye mixture according to claim 1 and at least one dispersing agent, surfactant or wetting agent.

4. A dye mixture according to claim 1, wherein $R_B^3$ is optionally substituted $C_{7-20}$alkyl.

5. A dye mixture according to claim 4, wherein $R_B^1$ is H, $R_B^2$ is C$_4$H$_9$ and $R_B^3$ is 1-methyl-n-hexyl.

6. A dye mixture according to claim 5, wherein component (B) is a pyrroline type dye (B$^1$) of the formula (II) wherein $R_B^1$ is H, $R_B^2$ is C$_4$H$_9$ and $R_B^3$ is 1-methyl-n-hexyl or is a mixture of the pyrroline-type dye (B$^1$) with a pyrroline-type dye (B$^2$) of the formula (II), wherein $R_B^1$ is H, and each of $R_B^2$ and $R_B^3$ is C$_4$H$_9$, which pyrroline type dye mixture contains up to 10%, by weight of the total weight of the pyrroline-type dye mixture of the dye (B$^2$).

7. A dye mixture according to claim 4, wherein component (B) is a pyrroline-type dye (B$^3$) or (B$^4$), each of the formula (II), or is a mixture of the dyes (B$^3$) and (B$^4$)

which dye (B$^3$) is a dye wherein $R_B^1$ is H, $R_B^2$ is ethyl and $R_B^3$ is n-octyl and which dye (B$^4$) is a dye wherein $R_B^1$ is H, $R_B^2$ is ethyl and $R_B^3$ is 2-ethyl-n-hexyl.

8. A dye mixture according to claim 1, wherein $R_B^3$ is optionally substituted $C_{1-6}$alkyl.

9. A dye mixture according to claim 8, wherein $R_B^1$ is H or allyl, $R_B^2$ is 3-phenyl-n-propyl and $R_B^3$ is C$_4$H$_9$.

10. A dye mixture according to claim 1, wherein the ratio, by weight, of dye (I):dye (II) is from 95:5 to 30:70.

11. A dye mixture according to claim 10, wherein the said ratio is from 85:15 to 35:65.

12. A dye mixture according to claim 11, wherein the said ratio is from 70:30 to 40:60.

13. A dye mixture according to claim 1, further comprising at least one additional dye.

14. A dye mixture according to claim 1, which comprises, as component (A), a monoazo dye (A1) of the formula (1) wherein $X_A$ is Br, $R_A$ is NHCOQ, where Q is CH$_3$ or C$_2$H$_5$ and each of $R_A^1$ and $R_A^2$ is C$_2$H$_5$, or a mixture of monoazo dyes (A1$^1$) and (A1$^2$) each of the formula (I) wherein, in each dye, $X_A$ is Br, in dye (A1$^1$) $R_A$ is NHCOCH$_3$ and in dye (A1$^2$) $R_A$ is NHCOC$_2$H$_5$; and, as component (B), at least a pyrroline type dye (B1) of the formula (II), wherein $R_B^1$ is H and D is a group of the formula

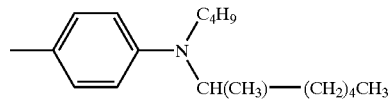

and optionally up to 10% inclusive by weight of the total component (B) of a pyrroline type dye (B2) of the formula (II), wherein $R_B^1$ is H and D is a group of the formula

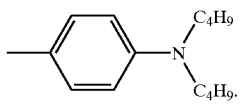

15. A dye mixture according to claim 14, wherein the weight ratio of component (A): component (B) is from 90:10 to 80:20.

16. A dye mixture according to claim 1, which comprises, as component (A), a monoazo dye (A2) of the formula (I), wherein X is CN, $R_A$ is $CH_3$, and each of $R_A^1$ and $R_A^2$ is ethyl and as component (B), at least a pyrroline type dye (B1) of the formula (II), wherein $R_B^1$ is H and D is a group of the formula

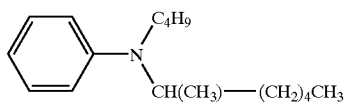

and optionally additionally up to 10% inclusive by weight of the total component (B) of a pyrroline type dye (B2) of the formula (II), wherein $R_B^1$ is H and D is a group of the formula

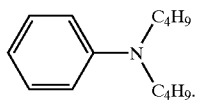

17. A dye according to claim 16, wherein the weight ratio of component (A): component (B) is from 70:30 to 55:45.

18. A dye mixture according to claim 1, which comprises, as component (A), a monoazo aye (A3) of the formula (I), wherein $X_A$ is CN, $R_A$ is $CH_3$, $R_A^1$ is $CH_3$ and $R_A^2$ is 3-phenyl-n-propyl and as component (B), at least a pyrroline type dye (B1) of the formula (II), wherein $R_B^1$ is H and D is a group of the formula

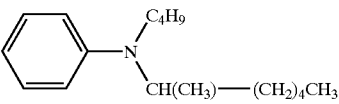

and optionally additionally up to 10% inclusive by weight of the total component (B) of a pyrroline type dye (B2) of the formula (II), wherein $R_B^1$ is H and D is a group of the formula

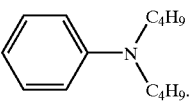

19. A dye mixture according to claim 18, wherein the weight ratio of component (A): component (B) is from 70:30 to 55:45.

20. A process for colouring a synthetic textile material or fibre blend thereof, which comprises applying thereto a dye mixture according to claim 1.

21. A process according to claim 20, wherein the synthetic textile material or fiber blend thereof is a polyester or polyester-cellulose or polyester-wool blend.

22. A process for colouring a synthetic textile material or fiber blend thereof, which comprises applying thereto a composition according to claim 3, dispersed in an aqueous medium.

* * * * *